United States Patent [19]
Sugizaki

[11] Patent Number: 5,933,561
[45] Date of Patent: Aug. 3, 1999

[54] OPTICAL FIBER CONNECTING BODY

[75] Inventor: Ryuichi Sugizaki, Ichihara, Japan

[73] Assignee: The Furukawa Electric Co., Ltd., Tokyo, Japan

[21] Appl. No.: 09/005,930

[22] Filed: Jan. 12, 1998

[30] Foreign Application Priority Data

Jan. 17, 1997 [JP] Japan .................................... 9-005910

[51] Int. Cl.$^6$ .................. G02B 6/02; G02B 6/26
[52] U.S. Cl. ........................... 385/123; 385/124; 385/28; 385/31
[58] Field of Search ..................... 385/123, 124, 385/127, 28, 29, 31, 50, 55, 58, 73

[56] References Cited

U.S. PATENT DOCUMENTS

| | | | |
|---|---|---|---|
| 4,763,976 | 8/1988 | Nolan et al. | 385/28 |
| 5,416,862 | 5/1995 | Haas et al. | 385/28 |
| 5,740,297 | 4/1998 | Omishi et al. | 385/127 |
| 5,781,673 | 7/1998 | Reed et al. | 385/24 |
| 5,854,871 | 12/1998 | Akasaka | 385/123 |

*Primary Examiner*—Hemang Sanghavi
*Attorney, Agent, or Firm*—Frishauf, Holtz, Goodman, Langer & Chick, P.C.

[57] ABSTRACT

An optical fiber connecting body comprising a positive dispersion optical fiber having chromatic dispersion at a transmission wavelength and a dispersion compensating optical fiber for canceling the chromatic dispersion of the positive dispersion optical fiber. A cladding diameter of the dispersion compensating optical fiber is smaller than that of the positive dispersion optical fiber and an optical fiber for connection is optically connected between the positive dispersion optical fiber and the dispersion compensating optical fiber.

4 Claims, 3 Drawing Sheets

FIG. 5
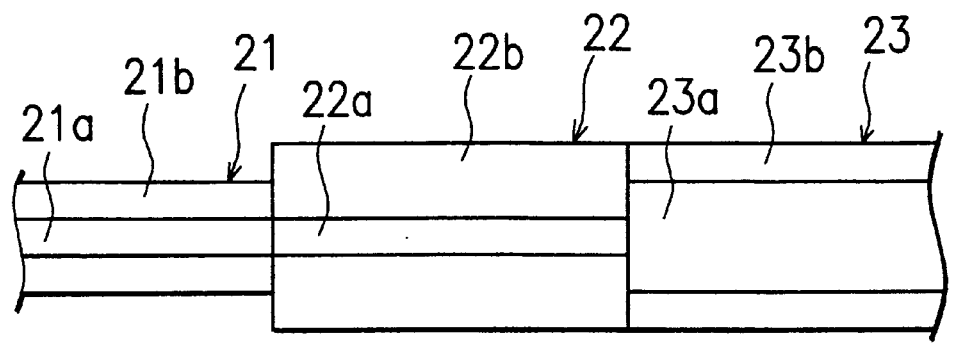
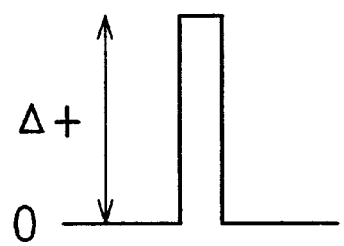
FIG. 6A
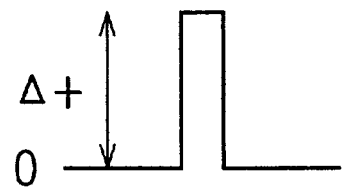
FIG. 6B
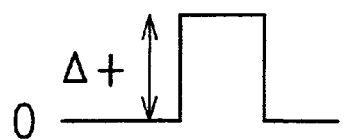
FIG. 6C

OPTICAL FIBER CONNECTING BODY

BACKGROUND OF THE INVENTION

1. Field of the Invention

The present invention relates to an optical fiber connecting body in which a positive dispersion fiber having chromatic dispersion at a transmission wavelength is connected to a dispersion compensating fiber for canceling the chromatic dispersion of the positive dispersion fiber.

2. Description of the Prior Art

An optical fiber generally arranged as an optical communication transmission path at present is a single mode optical fiber having zero dispersion in 1.3 $\mu$m band.

It is now considered at present to perform high speed communication by optical signal having 1.55 $\mu$m in band so as to increase the capacity of an optical communication network with respect to this single mode optical fiber already arranged.

This single mode optical fiber having zero dispersion wavelength in 1.3 $\mu$m band has about 17 ps/nm/km in chromatic dispersion around 1.55 $\mu$m. Therefore, a dispersion compensating means for compensating this chromatic dispersion is required when optical signal having 1.55 $\mu$m in band is used.

There is a method for canceling this dispersion by connecting a dispersion compensating optical fiber having negative dispersion in an optical fiber transmission path as a practical method of the dispersion compensating. However, the dispersion compensating optical fiber used for this purpose has a considerable long length. Accordingly, it is actual to wind this dispersion compensating optical fiber in a coil shape and assemble this optical fiber into the optical communication transmission path as a package.

It is convenient in treatment to make the dispersion compensating optical fiber compact so as to assemble such a long dispersion compensating optical fiber into a transmission device as a package.

However, when the long dispersion compensating optical fiber is wound in a coil shape, an occupying size of the coil depends on a volume and a vacant space ratio of the optical fiber. Therefore, when the long dispersion compensating optical fiber has a large cross section, i.e., a large diameter, this dispersion compensating optical fiber becomes a large coil, which leads to an increase in size of the transmission device which contains the dispersion compensating optical fiber.

Therefore, it is normally desirable to reduce an outside diameter of the dispersion compensating optical fiber as much as possible.

Fusion splicing is generally used when the dispersion compensating optical fiber is connected to the normally used single mode optical fiber of zero dispersion having 1.3 $\mu$m in band. However, the normal single mode optical fiber has core diameter of 10 $\mu$m. In contrast to this, the dispersion compensating optical fiber has core diameter of 2 $\mu$m. Accordingly, the core diameters of the single mode optical fiber and the dispersion compensating optical fiber are different from each other. Further, when the outside diameter (cladding diameter) of the dispersion compensating optical fiber is reduced in comparison with the normal single mode optical fiber to reduce the diameter of the dispersion compensating optical fiber, a problem exists in that it is more difficult to connect these optical fibers to each other since the dispersion compensating optical fiber is connected to the single mode optical fiber having a normal outside diameter. And in that a connection loss is increased.

SUMMARY OF THE INVENTION

An object of the present invention is to provide an optical fiber connecting body in which a positive dispersion optical fiber and a dispersion compensating optical fiber are connected to each other, and the dispersion compensating optical fiber having a small outside diameter can be compactly wound in a coil shape and the dispersion compensating optical fiber can be easily connected to a single mode optical fiber with a low connection loss already arranged even when the diameter of the dispersion compensating optical fiber is reduced.

Means for Solving the Problems

The optical fiber connecting body of the present invention is characterized in the following construction to solve the above problems.

This optical fiber connecting body comprises a positive dispersion optical fiber having chromatic dispersion at a transmission wavelength and a dispersion compensating optical fiber for canceling the chromatic dispersion of the positive dispersion optical fiber, and is constructed such that a cladding diameter of the dispersion compensating optical fiber is smaller than that of the positive dispersion optical fiber and an optical fiber for connection is optically connected between the positive dispersion optical fiber and the dispersion compensating optical fiber.

A core diameter of the optical fiber for connection is preferably set to be approximately equal to or greater than that of the dispersion compensating optical fiber and is preferably set to be approximately equal to or smaller than that of the positive dispersion optical fiber. An outside diameter of the optical fiber for connection is preferably set to be approximately equal to or greater than that of the dispersion compensating optical fiber and is preferably set to be approximately equal to or smaller than that of the positive dispersion optical fiber.

Further, the positive dispersion optical fiber is preferably a single mode optical fiber.

In accordance with the optical fiber connecting body of claim 1 of the present invention, the cladding diameter of the dispersion compensating optical fiber is smaller than that of the positive dispersion optical fiber and the optical fiber for connection is connected between the positive dispersion optical fiber and the dispersion compensating optical fiber. Therefore, a core diameter of this optical fiber for connection and its outside diameter are set such that this core diameter and this outside diameter respectively match with core diameters of the positive dispersion optical fiber and the dispersion compensating optical fiber and their outside diameters. Accordingly, when these optical fibers are melted and connected to each other, axes of these optical fibers are easily aligned with each other. Further, total connection loss of the optical fiber connecting body can be reduced even when the number of connecting portions is increased.

Further, the outside diameter of the optical fiber for connection is stepwise reduced from the outside diameter of the positive dispersion optical fiber to the outside diameter of the dispersion compensating optical fiber by setting this outside diameter of the optical fiber for connection between the outside diameters of the dispersion compensating optical fiber and the positive dispersion optical fiber. Therefore, an axial alignment of the optical fiber connecting body is easily made in the fusion splicing. Accordingly, no problem is caused in this connection when the outside diameter of the dispersion compensating optical fiber is set to be smaller than that of the optical fiber for connection.

As a result, the outside diameter of the dispersion compensating optical fiber can be set to be smaller than that of a normal optical fiber so that the dispersion compensating optical fiber can be formed as a compact coil.

In accordance with the optical fiber connecting body of claim 2 of the present invention, a core diameter of the optical fiber for connection is set to be approximately equal to or greater than that of the dispersion compensating optical fiber and is set to be approximately equal to or smaller than that of the positive dispersion optical fiber. Therefore, the optical fiber connecting body having the positive dispersion optical fiber and the dispersion compensating optical fiber can be obtained as follows.

End faces of the dispersion compensating optical fiber and the optical fiber for connection are first opposed to each other and are set onto an axial aligning base of a fusion splicing device.

Next, optical signal is incident from one of the optical fibers, e.g., the dispersion compensating optical fiber to the optical fiber for connection. While one of these optical fibers is moved in the directions of X and Y axes on the axial aligning base, a position providing a maximum optical signal transmitting amount is detected by a receiver so that core axes of both these optical fibers are conformed to each other.

Next, the dispersion compensating optical fiber and the optical fiber for connection are connected to each other by performing their fusion splicing in a normal connecting condition in a conforming state of both the core axes.

Similar to the above case, the optical fiber for connection and the positive dispersion optical fiber are also melted and connected to each other.

When the fusion splicing device is of a so-called core direct viewing type, similar to the fusion splicing of the normal optical fiber, both the optical fibers are easily melted and connected to each other by directly viewing the respective cores on a monitor screen in a state in which core axes of these optical fibers are conformed to each other.

As mentioned above, in the optical fiber connecting body of the present invention, the cladding diameter of the dispersion compensating optical fiber is smaller than that of the positive dispersion optical fiber and the core diameter of the optical fiber for connection lies between the core diameters of the dispersion compensating optical fiber and the positive dispersion optical fiber. Therefore, the diameter of the optical fiber connecting body is stepwise reduced from the core of the positive dispersion optical fiber to the core of the dispersion compensating optical fiber. Accordingly, the cores are easily axially aligned with each other and the total connection loss is reduced although the number of connecting portions is increased.

The outside diameter of the optical fiber for connection lies between the outside diameters of the dispersion compensating optical fiber and the positive dispersion optical fiber. Therefore, the outside diameter of the optical fiber for connection is stepwise reduced from the outside diameter of the positive dispersion optical fiber to the outside diameter of the dispersion compensating optical fiber. Therefore, the axial alignment is easily made in the fusion splicing. Further, no problem is caused in this connection even when the outside diameter of the dispersion compensating optical fiber is set to be smaller than that of the optical fiber for connection.

As a result, a compact coil can be made by setting the outside diameter of the dispersion compensating optical fiber to be smaller than that of the normal optical fiber.

The above objects of the present invention and the other objects, features and advantages of the present invention will become more apparent from the following detailed explanation based on the accompanying drawings.

BRIEF DESCRIPTION OF THE DRAWINGS

FIG. 5 is a schematic constructional view showing a third embodiment of the optical fiber connecting body of the present invention and typically showing this optical fiber connecting body; and FIGS. 6A to 6C are refractive index distributing views showing the respective concrete refractive index profiles of a dispersion compensating optical fiber, an optical fiber for connection and a single mode optical fiber in the optical fiber connecting body of FIG. 5.

DETAILED DESCRIPTION OF THE PREFERRED EMBODIMENTS

An optical fiber connecting body of the present invention will next be explained in detail with reference to FIGS. 1 to 6C.

Embodiment 1

Figure 1:
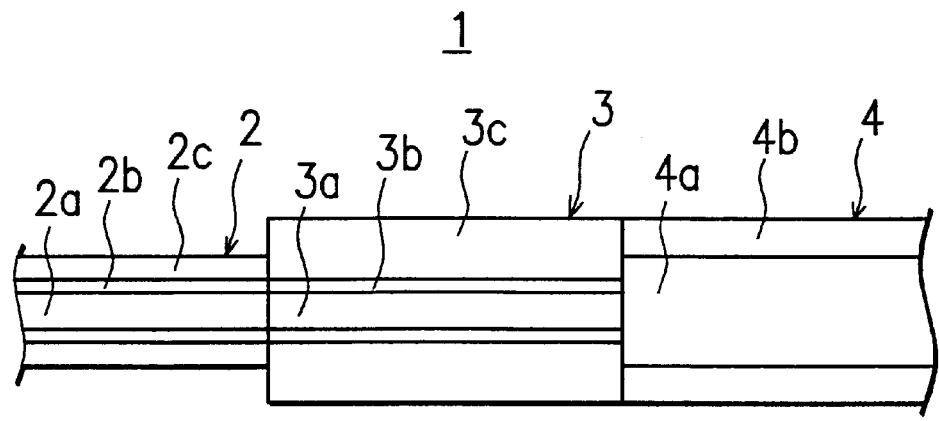
FIG. 1 is a schematic constructional view showing a first embodiment of an optical fiber connecting body of the present invention and typically showing this optical fiber connecting body.

FIG. 1 typically shows the construction of an optical fiber connecting body 1 of the present invention. An optical fiber 3 for connection is melted and connected between a dispersion compensating optical fiber 2 and a single mode optical fiber 4 by optically aligning the axes of center cores $2a$, $3a$ and core $4a$ with each other.

Figure 2A:
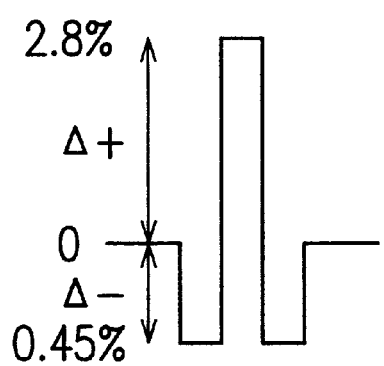
FIGS. 2A to 2C are refractive index distributing views showing the respective concrete refractive index profiles of a dispersion compensating optical fiber, an optical fiber for connection and a single mode optical fiber in the optical fiber connecting body of FIG. 1.
Figure 2B:
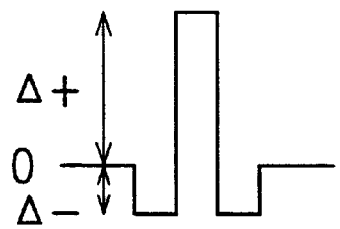
Figure 2C:
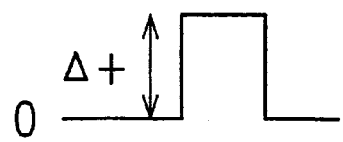

As shown in FIG. 2A, the dispersion compensating optical fiber 2 is an optical fiber having a W-shaped refractive index profile of $\Delta+2.8\%$ and $\Delta-0.45\%$. In this dispersion compensating optical fiber 2, an internal cladding $2b$ and an external cladding $2c$ are formed outside the center core $2a$. In FIG. 2A, $\Delta+$ and $\Delta-$ respectively show a difference in specific refractive index of the center core $2a$ and a difference in specific refractive index of the internal cladding $2b$ relative to the external cladding $2c$. Here, in the dispersion compensating optical fiber 2, an outside diameter of the center core $2a$ is set to 2 $\mu$m and an outside diameter of the internal cladding $2b$ is set to 5 $\mu$m and an outside diameter of the external cladding $2c$ is set to 50 $\mu$m. In FIGS. 2A to 2C, an axis of ordinate shows a difference in specific refractive index and an axis of abscissa shows a distance ($\mu$m) in a diametrical direction of the optical fiber. Such contents are similarly shown in FIGS. 4A to 4C and FIGS. 6A to 6C.

The optical fiber 3 for connection is an optical fiber having a W-shaped refractive index profile shown in FIG. 2B. In this optical fiber 3 for connection, an internal cladding 3b and an external cladding 3c are formed outside a center core 3a. In the optical fiber 3 for connection, a diameter of the center core 3a is set to be approximately equal to or greater than that of the center core 2a of the dispersion compensating optical fiber 2, and is also set to be approximately equal to or smaller than the diameter of the center core 2a of the positive dispersion optical fiber 2. An outside diameter of the optical fiber 3 for connection is set to be approximately equal to or greater than that of the dispersion compensating optical fiber 2 and is also set to be approximately equal to or smaller than the outside diameter of the single mode optical fiber 4.

The single mode optical fiber 4 is a positive dispersion optical fiber having chromatic dispersion around 1.55 μm and has a refractive index profile shown in FIG. 2C. In this single mode optical fiber 4, a cladding 4b is formed outside the core 4a. In the single mode optical fiber 4, an outside diameter of the core 4a is set to 8 μm and an outside diameter of the cladding 4b is set to 125 μm.

In the optical fiber connecting body 1 constructed above, RΔ and Ra of the optical fiber 3 for connection were fixedly set, and Δ+, an outside diameter of the center core 3a and an outside diameter of the external cladding 3c were changed as shown in Table 1. Thus, the connection loss of test optical signal transmitted through the optical fiber connecting body 1 was measured. The measured results are shown in this table 1. Here, RΔ=Δ-/Δ+, Ra are values (Ra=DCO/DCL) provided by dividing the outside diameter (DCO) of the center core 3a by the outside diameter (DCL) of the internal cladding 3b.

The connection loss was measured by a reference measuring method of JIS(Japanese Industrial Standard)-C6841.

TABLE 1

Total connection loss (dB) when the optical fiber for connection having the W-shaped refractive index profile was used

| Δ+<br>center core outside diameter<br>external cladding outside diameter | 0.3<br>2 μm | 1.0<br>4 μm | 2.0<br>6 μm | 2.8<br>8 μm |
|---|---|---|---|---|
| 50 μm | 1.1 | 1.5 | 1.9 | 2.3 |
| 80 μm | 1.4 | 1.7 | 1.7 | 1.9 |
| 100 μm | 2.0 | 1.7 | 1.5 | 1.9 |
| 125 μm | 2.3 | 1.8 | 1.7 | 2.0 |

As shown in the table 1, the total connection loss of the optical fiber connecting body 1 was 2.3 dB when the outside diameter of the external cladding 3c was 125 μm and the outside diameter of the center core 3a was 2 μm. This total connection loss was also 2.3 dB when the outside diameter of the external cladding 3c was 50 μm and the outside diameter of the center core 3a was 8 μm. In contrast to this, the connection loss was 2.1 dB when the dispersion compensating optical fiber 2 and the single mode optical fiber 4 were directly connected to each other and this connection loss was similarly measured.

Accordingly, as can be clearly seen from the results of the table 1, the connection loss of the optical fiber connecting body 1 in each of the above two examples was increased in comparison with the case in which the dispersion compensating optical fiber 2 and the single mode optical fiber 4 were directly connected to each other. Thus, no function of the optical fiber 3 for connection was fulfilled. However, in all the other cases, it should be understood that the connection loss of the optical fiber connecting body 1 is reduced in comparison with the case in which the dispersion compensating optical fiber 2 and the single mode optical fiber 4 are directly connected to each other.

Embodiment 2

Figure 3:
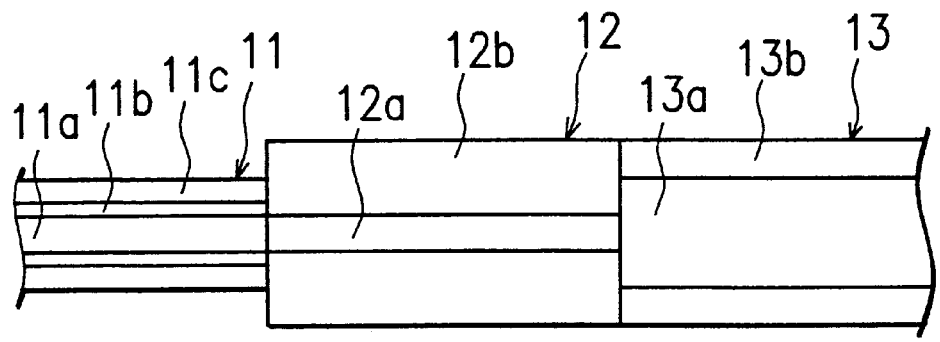
FIG. 3 is a schematic constructional view showing a second embodiment of the optical fiber connecting body of the present invention and typically showing this optical fiber connecting body.
Figure 4A:
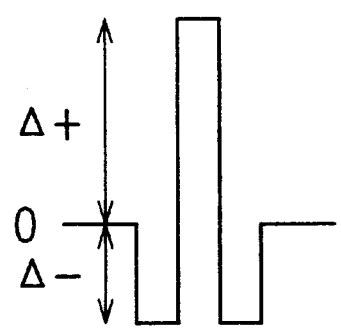
FIGS. 4A to 4C are refractive index distributing views showing the respective concrete refractive index profiles of a dispersion compensating optical fiber, an optical fiber for connection and a single mode optical fiber in the optical fiber connecting body of FIG. 3.
Figure 4B:
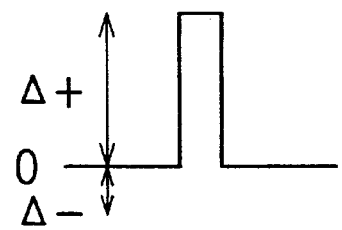
Figure 4C:
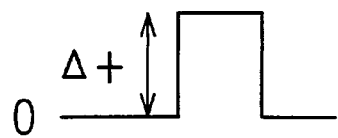

As shown in FIG. 3, in an optical fiber connecting body 10, an optical fiber 12 for connection is optically connected between a dispersion compensating optical fiber 11 and a single mode optical fiber 13 respectively having constructions similar to those of the dispersion compensating optical fiber 2 and the single mode optical fiber 4 in the embodiment 1. The respective optical fibers have sizes shown in FIG. 3 with respect to the outside diameters of cores and claddings.

In the dispersion compensating optical fiber 11, an internal cladding 11b and an external cladding 11c are formed outside a center core 11a. This dispersion compensating optical fiber 11 has a refractive index profile shown in FIG. 4A.

In the optical fiber 12 for connection, a cladding 12b is formed outside a center core 12a. This optical fiber 12 for connection has a matched cladding type refractive index profile shown in FIG. 4B.

In the single mode optical fiber 13, a cladding 13b is formed outside a core 13a. This single mode optical fiber 13 has a refractive index profile shown in FIG. 4C.

In the optical fiber connecting body 10 having the above construction, similar to the embodiment 1, the total connection loss was measured when Δ+ of the optical fiber 12 for connection and outside diameters of the center core 12a and the cladding 12b were changed as shown in Table 2. The measured results are obtained as shown in this table 2.

TABLE 2

Total connection loss (dB) when the optical fiber for connection having the matched cladding type refractive index profile was used

| Δ+<br>center core outside diameter<br>cladding outside diameter | 0.3<br>2 μm | 1.0<br>4 μm | 2.0<br>6 μm | 2.8<br>8 μm |
|---|---|---|---|---|
| 50 μm | 1.0 | 1.5 | 1.8 | 2.3 |
| 80 μm | 1.2 | 1.4 | 1.4 | 1.8 |
| 100 μm | 1.8 | 1.5 | 1.5 | 1.9 |
| 125 μm | 2.2 | 1.9 | 1.8 | 2.0 |

Similar to the embodiment 1, in this embodiment 2, the total connection loss of the optical fiber connecting body 10 was 2.2 dB when the outside diameter of the cladding 12b was 125 μm and the outside diameter of the center core 12a was 2 μm. This total connection loss was 2.3 dB when the outside diameter of the cladding 12b was 50 μm and the outside diameter of the center core 12a was 8 μm. In contrast to this, the connection loss was 2.1 dB when the dispersion compensating optical fiber 11 and the single mode optical fiber 13 were directly connected to each other and this connection loss was similarly measured.

Accordingly, as can be clearly seen from the results shown in the table 2, the connection loss of the optical fiber connecting body 10 in each of the above two examples was large in comparison with the case in which the dispersion compensating optical fiber 11 and the single mode optical fiber 13 were directly connected to each other. Thus, no function of the optical fiber 12 for connection was fulfilled. However, in all the other cases, the connection loss of the optical fiber connecting body 10 was reduced in comparison with the case in which the dispersion compensating optical fiber 11 and the single mode optical fiber 13 were directly connected to each other.

Embodiment 3

As shown in FIG. 5, in an optical fiber connecting body 20, an optical fiber 22 for connection is optically connected between a dispersion compensating optical fiber 21 and a single mode optical fiber 23 having a construction similar to that of the single mode optical fiber 4 in the embodiment 1. The respective optical fibers have sizes shown in FIG. 5 with respect to the outside diameters of cores and claddings.

In the dispersion compensating optical fiber 21, a cladding 21b having 50 μm in outside diameter is formed outside a center core 21a having 2.5 μm in outside diameter. The dispersion compensating optical fiber 21 has a matched cladding type refractive index profile shown in FIG. 6A.

In the optical fiber 22 for connection, a cladding 22b is formed outside a center core 22a. This optical fiber 22 for connection has a matched cladding type refractive index profile shown in FIG. 6B.

In the single mode optical fiber 23, a cladding 23b is formed outside a core 23a. This single mode optical fiber 23 has a refractive index profile shown in FIG. 6C.

In the optical fiber connecting body 20 having the above construction, similar to the embodiment 1, the total connection loss was measured when Δ+ of the optical fiber 22 for connection and outside diameters of the center core 22a and the cladding 22b were changed as shown in Table 3. The measured results were obtained as shown in this table 3.

TABLE 3

Total connection loss (dB) when the optical fiber for connection having the matched cladding type refractive index profile was used

| Δ+ | 0.3 | 1.0 | 2.0 | 2.8 |
|---|---|---|---|---|
| center core outside diameter | 2.5 μm | 4.0 μm | 6.0 μm | 8.0 μm |
| cladding outside diameter | | | | |
| 50 μm | 0.8 | 1.1 | 1.2 | 1.6 |
| 80 μm | 1.0 | 1.1 | 1.2 | 1.4 |
| 100 μm | 1.3 | 1.2 | 1.3 | 1.4 |
| 125 μm | 1.6 | 1.3 | 1.3 | 1.2 |

Similar to the embodiment 1, in this embodiment 3, the total connection loss of the optical fiber connecting body 20 was 1.6 dB when the outside diameter of the cladding 22b was 125 μm and the outside diameter of the center core 22a was 2.5 μm. This total connection loss was also 1.6 dB when the outside diameter of the cladding 22b was 50 μm and the outside diameter of the center core 22a was 8 μm. In contrast to this, the connection loss was 1.5 dB when the dispersion compensating optical fiber 21 and the single mode optical fiber 23 were directly connected to each other and this connection loss was similarly measured.

Accordingly, as can be clearly seen from the results shown in the table 3, the connection loss of the optical fiber connecting body 20 in each of the above two examples was large in comparison with the case in which the dispersion compensating optical fiber 21 and the single mode optical fiber 23 were directly connected to each other. Thus, no function of the optical fiber 22 for connection was fulfilled. However, in all the other cases, the connection loss of the optical fiber connecting body 20 was reduced in comparison with the case in which the dispersion compensating optical fiber 21 and the single mode optical fiber 23 were directly connected to each other.

What is claimed is:

1. An optical fiber connecting body comprising a positive dispersion optical fiber having chromatic dispersion at a transmission wavelength and a dispersion compensating optical fiber for canceling the chromatic dispersion of said positive dispersion optical fiber, and constructed such that a cladding diameter of said dispersion compensating optical fiber is smaller than that of said positive dispersion optical fiber and an optical fiber for connection is optically connected between said positive dispersion optical fiber and said dispersion compensating optical fiber.

2. The optical fiber connecting body as claimed in claim 1, wherein a core diameter of said optical fiber for connection is set to be approximately equal to or greater than that of said dispersion compensating optical fiber and is set to be approximately equal to or smaller than that of said positive dispersion optical fiber, and an outside diameter of said optical fiber for connection is set to be approximately equal to or greater than that of said dispersion compensating optical fiber and is set to be approximately equal to or smaller than that of said positive dispersion optical fiber.

3. The optical fiber connecting body as claimed in claim 1, wherein said positive dispersion optical fiber is a single mode optical fiber.

4. The optical fiber connecting body as claimed in claim 2, wherein said positive dispersion optical fiber is a single mode optical fiber.

* * * * *